United States Patent [19]
Frank et al.

[11] Patent Number: 5,923,801
[45] Date of Patent: Jul. 13, 1999

[54] OPTICAL BRANCHING ELEMENT

[75] Inventors: Werner Frank, Darmstadt; Angelika Stelmaszyk, Gross-Umstadt; Hans Strack, Rossdorf, all of Germany

[73] Assignee: Deutsche Telekom AG, Bonn, Germany

[21] Appl. No.: 08/902,464

[22] Filed: Jul. 29, 1997

[30] Foreign Application Priority Data

Jul. 30, 1996 [DE] Germany ............................ 196 30 706

[51] Int. Cl.$^6$ ..................................................... G02B 6/26
[52] U.S. Cl. .................................. 385/50; 385/45; 385/31
[58] Field of Search ................................... 385/50, 42–49, 385/14, 39, 16–24, 31

[56] References Cited

U.S. PATENT DOCUMENTS 5,539,847 7/1996 Lerminiaux et al. ...................... 385/45
5,732,181 3/1998 Enberg et al. .......................... 385/50 X

OTHER PUBLICATIONS

Zirngibl, et al., "Efficient 1×16 Optical Power Splitter Based on InP", Electronics Letters, 18th Jun. 1992, vol. 28 No. 13, pp. 1212–1213;.

Takahashi, et al., "Design and Fabrication of Silica–Based Integrated–Optic 1×28 Power Splitter", Electronics Letters, 7th Nov. 1991, vol. No. 23, pp. 2131–2133;.

Schösser, et al., "Optical components in polymers", SPIE—The International Society for Optical Engineering, Reprinted from Current Developments in Optical Design and Engineering V, 12–13 Jul. 1995, vol. 2540, pp. 110–117.

Primary Examiner—Phan T. H. Palmer
Attorney, Agent, or Firm—Kenyon & Kenyon

[57] ABSTRACT

An optical branching element has an input waveguide (10) and a plurality of output waveguides (20a, 20b), which are so disposed at a distance from the input waveguide (10) that a beam of light launched into the input waveguide (10) over a coupling path of a predefined length couples over with a defined intensity into the output waveguides (20a, 20b).

8 Claims, 3 Drawing Sheets

OPTICAL BRANCHING ELEMENT

FIELD OF THE INVENTION

The invention relates generally to an optical branching element, and more particularly to an optical branching element which is fabricated in a transparent material capable of being structured.

RELATED TECHNOLOGY

The multiple branching element is an important component used in optical communications. It is used, for example, to distribute optical information to a plurality of receivers. In general, a distinction can be made between passive and active optical branching elements. In known methods heretofore, "Y-shaped" branching elements and directional couplers are known as passive optical branching elements. Multiple branching elements have been manufactured by configuring Y-shaped branching elements or directional couplers of this kind in a cascading arrangement. Such a multiple branching element is described, inter alia, by M. Zirngibl in the essay "Efficient 1×16 Optical Power Splitter Based on InP", Electronic Letters, vol. 28 (13), pp. 1212–1213, 1992, and by H. Takahashi in the essay "Design and Fabrication of Silica Based Integrated-Optics 1×128 Power Splitter", Electronic Letters, vol. 27 (23), pp. 2131–2133, 1991. However, the multiple branching elements described in these essays are all fabricated from semiconductor materials or silica as substrate material. A considerable drawback of multiple branching elements produced from a cascading arrangement of Y-shaped branching elements is that, at high branching rates, they reach a length of several centimeters. Moreover, the light conducted in a Y-shaped branching element is subject to intense scattering at the angled branch points.

Efforts have been undertaken recently to develop polymer-based optical branching elements to reduce manufacturing costs and fiber-chip coupling losses of optical multiple branching elements. In the essay, "Optical Components in Polymers", SPIE vol. 2540, pp. 110–117, 1995, W. F. X. Frank, which is hereby incorporated by reference herein, describes a method for structuring polymers where the samples are first embossed and then exposed to planar irradiation. However, when embossing the Y-shaped branch structures, it is very difficult to form the angled branch points; therefore, it is precisely when the embossing method is used that it is hardly possible to fabricate Y-shaped branching elements without entailing any scattering losses.

SUMMARY OF THE INVENTION

An object of the present invention is to make available a passive, optical branching element that is simple to manufacture.

The present invention therefore provides an optical branching element in a transparent material that is capable of being structured, in particular in a polymer, having the following features:

an input waveguide (10) and a plurality of output waveguides (20a, 20b), which are disposed at a distance from the input waveguide (10) so that a beam of light launched into the input waveguide (10) over a coupling path of a predefined length ($L_3$) couples over with a defined intensity into the output waveguides (20a, 20b).

Accordingly, an optical branching element is formed in a transparent material that is capable of being structured- glass or polymer-, that has one input waveguide and a plurality of output waveguides. The output waveguides are so disposed at a distance from the input waveguide that a beam of light launched into the input waveguide over a coupling path of a predefined length couples over with a defined intensity into the output waveguides. The coupling occurs through the evanescent field emanating about waveguide 10. In this connection, scattering losses at angled branch points, as encountered in known Y-shaped branching elements, no longer occur.

Advantageous further developments include that the input waveguide (10) and the output waveguides (20a, 20b) run rectilinearly, at least in the area of the coupling path. The longitudinal axis of the input waveguide (10) form an acute angle α with the longitudinal axis of the output waveguides (20a, 20b). Moreover, the output waveguides (20a, 20b) may be arranged symmetrically to the input waveguide (10) and are offset from one another by a predefined length. In addition, the angle $α_i$ increases with the distance of the i-th output waveguide (20a, 20b) in question to the input waveguide (10). Preferably, the angle $α_j$ is in the range of 0.1° to 3°.

To be able to simplify the process for manufacturing an optical branching element in a transparent material that is capable of being structured, the input waveguides and the output waveguides run rectilinearly, at least in the area of the coupling path.

By selecting the acute angle α, which is defined by the position of the longitudinal axis of the input waveguide and of the longitudinal axis of the output waveguide in question, one can selectively permit the light intensity to couple over to the individual output waveguides. Since angle $α_i$ increases with the distance of the i-th output waveguide to the input waveguide, the coupling over of light between the input waveguide to the nearest output waveguide and from said next output waveguide to the directly adjacent output waveguide takes place via merely one predefined coupling path. At the end of the coupling path, the distance between the output waveguides is large enough to prevent any further coupling over. Another parameter which can be used to define the coupling path and, consequently, the intensity being coupled over to the individual output waveguides, is the length $L_i$, which indicates the displacement of the output waveguides relative to one another.

The input and output waveguides are expediently dimensionally designed to conduct only one mode.

BRIEF DESCRIPTION OF THE DRAWINGS

The present invention will be elucidated by way of example in the following on the basis of one specific embodiment, in conjunction with the enclosed drawing, in which.

DETAILED DESCRIPTION

Figure 1:
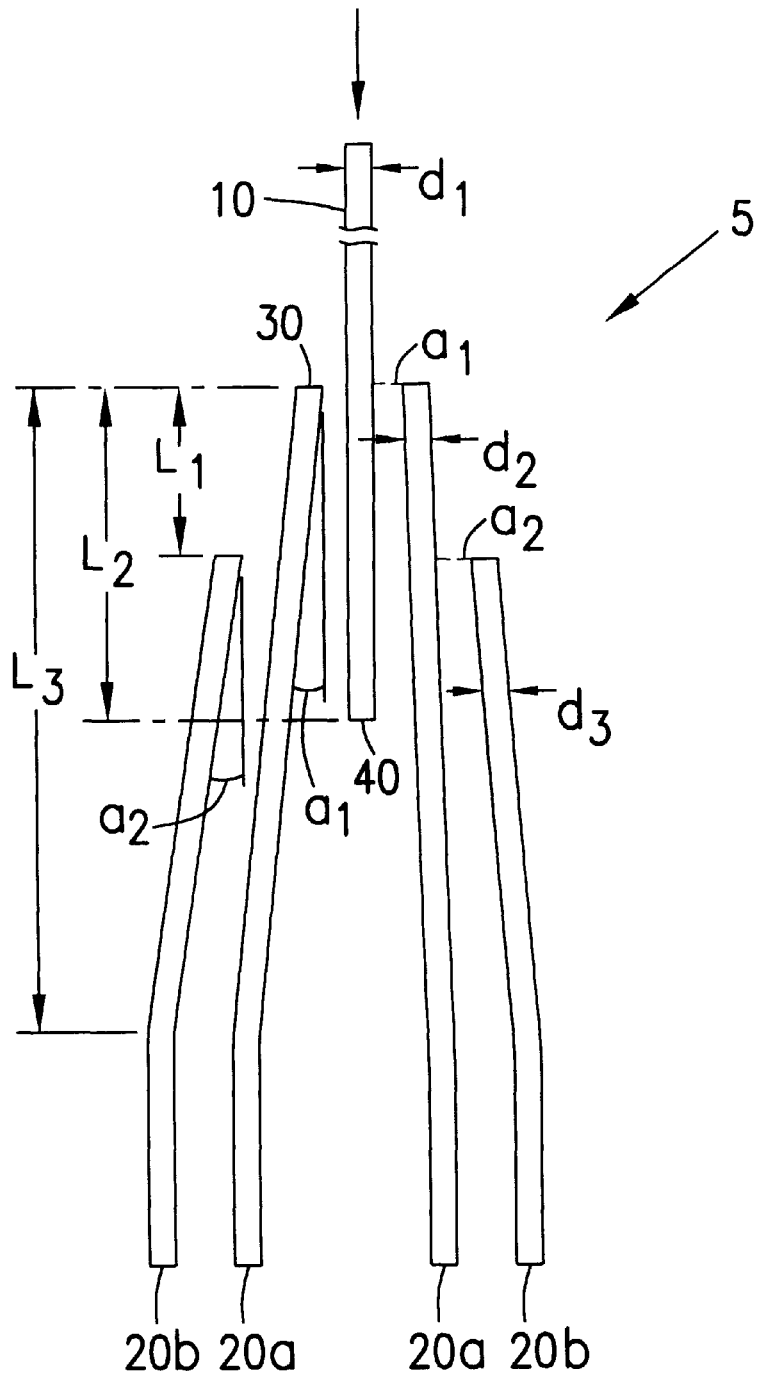
FIG. 1 shows an optical 1–4 branching element in a polymer.

FIG. 1 depicts an optical 1–4 branching element generally denoted by 5, which has been fabricated in a polymer. As polymer material, one can use, for example, polymethyl methacrylate (PMMA). A plurality of manufacturing methods are known, which can be used to produce wave-guiding structures in a polymer. Mentioned here, once again, is the method developed by W. F. X. Frank, incorporated by reference above, for first embossing the polymer material and subsequently exposing it to planar irradiation. Optical branching element 5 comprises a straight input waveguide 10, as well as four output waveguides 20a and 20b, which are disposed symmetrically about input waveguide 10 and run in a straight line, at least in coupling area $L_3$. (The two cross lines at input waveguide 10 indicate that the length of the input waveguide 10 is undetermined.)

What is exceptional about optical branching element 5 is that individual waveguides 10, 20a and 20b are arranged at a distance from one another and do not contain any branching points, as do the known Y-shaped branching elements. In addition, the straight structure of waveguides 10, 20a and 20b facilitates the fabrication process. It is noted here that it is not necessary for waveguides 10, 20a and 20b to run rectilinearly, rather they can be curved as needed, as long as this enables the intended purpose to be achieved. The width d of input waveguide 10 is equal to the width of output waveguides 20a and 20b and is preferably selected so as to allow the individual waveguides 10, 20a and 20b to conduct only one mode. As FIG. 1 shows, the individual output waveguides 20a and 20b are arranged in pairs symmetrically around input waveguide 10. Input waveguide 10 and output waveguides 20a and 20b are arranged to be so closely adjacent that light from input waveguide 10 can couple over to the nearest output waveguide 20a. Output waveguides 20a and 20b, in turn, are arranged to be so closely adjacent that light can couple over from output waveguides 20a into the adjoining output waveguides 20b. There is a correlation between the distance among waveguides 10, 20a and 20b and the penetration depth of the evanescent fields in those waveguides via which waveguides 10, 20a and 20b are coupled to one another. The penetration depth is a function of the difference between the refractive index of the waveguide in question and its ambient environment, of the wavelength, as well as of the mode angle. The difference in the refractive index is essentially established by the manufacturing method. Thus, in a polymer material (e.g., PMMA), for example under UV exposure, the refractive index increases by about $1.5 \times 10^{-3}$, measured at a wavelength of 633 nm. In this elevated refractive index range, the introduced light can be conducted by means of total reflection.

arranged in the direction of input waveguide 10. In other words, $\alpha_2$ corresponds to the distance between input-side end face 30 of output waveguide 20b and output waveguides 20a, whereas $\alpha_1$ corresponds to the distance between input-side end face 30 of output waveguide 20a and input waveguide 10. Length $L_1$ is the distance between input-side end face 30 of output waveguide 20a and input side end face 30 of output waveguide 20b, whereas length $L_2$ is the distance between input-side end face 30 of output waveguide 20a and output side end face 40 of input waveguide 10. At this point, it should also be mentioned that angle $\alpha_i$, length $L_i$ and distance $a_i$ are to be selected as a function of the wavelength of the introduced light. Although FIG. 1 shows a symmetrical, fanlike optical branching element 5, any configurations at all between input waveguide 10 and output waveguide 20 are conceivable. Output waveguides 20a and 20b diverge at very small angles $\alpha_1$ and $\alpha_2$ until the distance between them is large enough to rule out that any further light couples over between them. After that, output waveguides 20a and 20b curve, for example, with a radius of about 5 cm and, subsequently, continue again in parallel, so that they show a mutual clearance of about 250 μm at the output-side end face. The area from input-side end face 30 of inside output waveguide 20a up to the point where light is no longer coupled over between individual output waveguides 20a and 20b is referred to here as the coupling path.

Optical branching element 5 shown in FIG. 1 can be so dimensionally designed that a light beam launched into input waveguide 10 couples over via coupling path $L_3$ having a predefined length, essentially with the same intensity into output waveguides 20a, 20b. In the examples described in the following, length $L_3$ of the coupling path, given a wavelength of the introduced light of 835 nm, is about 7.4 mm and, given a wavelength of 1310 nm, about 12.5 mm. However, shorter coupling paths are also conceivable.

Figure 2:
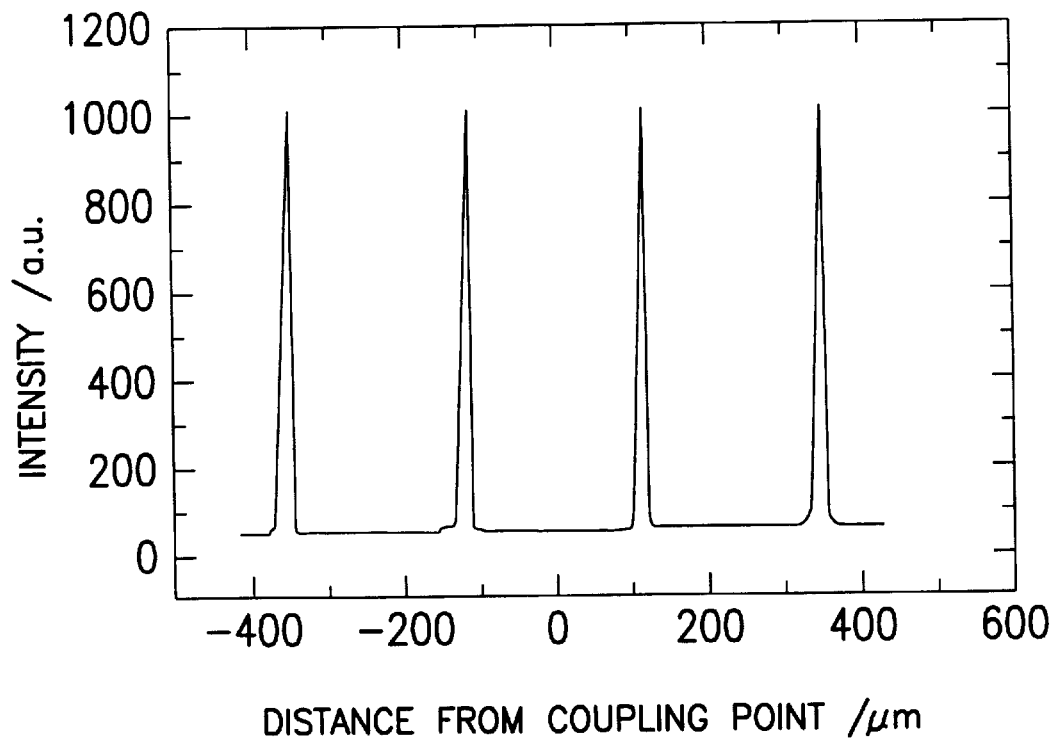
FIG. 2 shows the uniformly distributed light intensity measured (in arbitrary units) at the output of the output waveguide shown in FIG. 1, at a wavelength of 835 nm, plotted over the distance of the output waveguides from one another.
Figure 3:
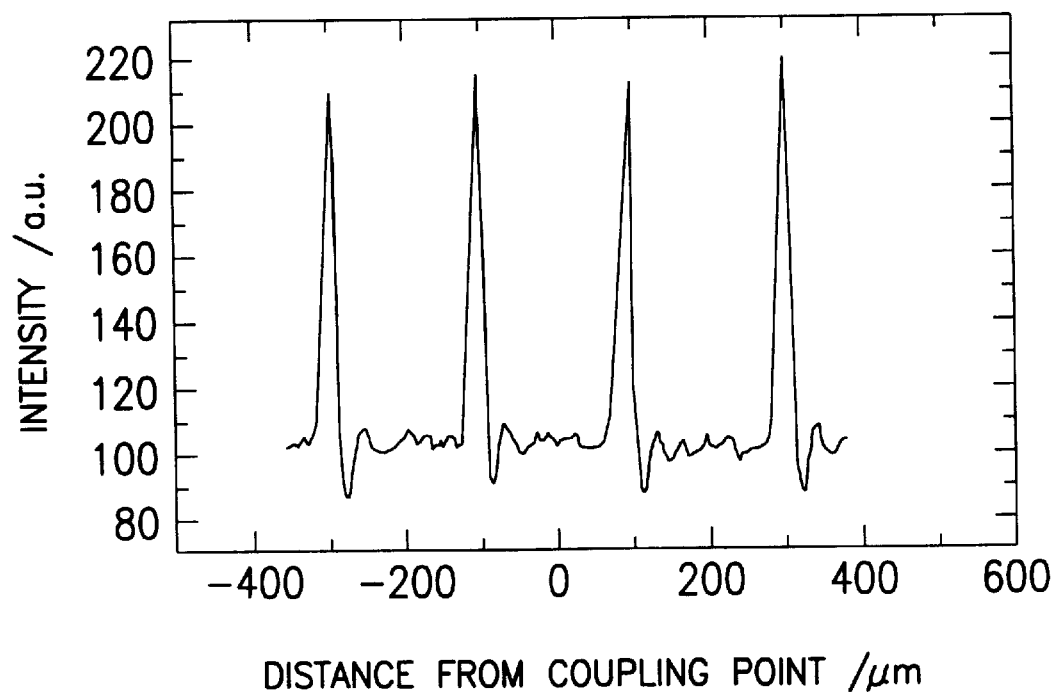
FIG. 3 shows the uniformly distributed light intensity measured (in arbitrary units) at the output of the output waveguide shown in FIG. 1, at a wavelength of 1310 nm, plotted over the distance of the output waveguides from one another.

A graph is shown in FIG. 2, depicting the light intensities measured at the output of four output waveguides 20a, 20b (not shown) in any unit at all. The wavelength of the introduced light was 835 nm. A similar graph is shown in FIG. 3, depicting the intensities measured at the output of four output waveguides 20a and 20b. The wavelength of the light launched into input waveguide 10 was 1,310 nm. The parameters for optical branching element 10 which produces the distribution of intensity illustrated in FIGS. 2 and 3, is specified in the following table:

|  | Waveguide width | a1 | a2 | α1 | α2 | L1 | L2 |
| --- | --- | --- | --- | --- | --- | --- | --- |
| 835 nm | 2 μm | 3.3 μm | 3.6 μm | 0.45° | 0.97° | 300 μm | 1000 μm |
| 1310 nm | 4 μm | 6.5 μm | 7.7 μm | 0.25° | 0.49° | 300 μm | 1300 μm |

The intensity of the light launched into input waveguide 10 can be selectively distributed to output waveguides 20a, 20b. For this, angles $\alpha_i$, distances $\alpha_i$, and lengths $L_i$ should be appropriately selected. Angle $\alpha_i$ is the angle formed by the longitudinal axis of input waveguide 10 and i-th output waveguide 20a or 20b; it increases with the distance of i-th output waveguide 20a or 20b from input waveguide 10, as shown in FIG. 1. In other words, angle $\alpha_2$ formed by the longitudinal axis of input waveguide 10 and the longitudinal axis of output waveguide 20a is smaller than angle $\alpha_2$ formed by the longitudinal axis of waveguide 10 and the longitudinal axis of output waveguide 20b. Distance $\alpha_i$ is the distance between input-side end face 30 of an i-th output waveguide and adjacent waveguide 20a or 10 in question, As can be inferred from the graphs of FIGS. 2 and 3, on the output side, output waveguides 20a and 20b have a mutual clearance of about 250 μm. The width $d_1$ of the input waveguide and widths $d_2$ and $d_3$ of output waveguides 20a and 20b, respectively, are the same in these examples. It should be emphasized again that the values named here have merely been selected as examples.

Figure 4:
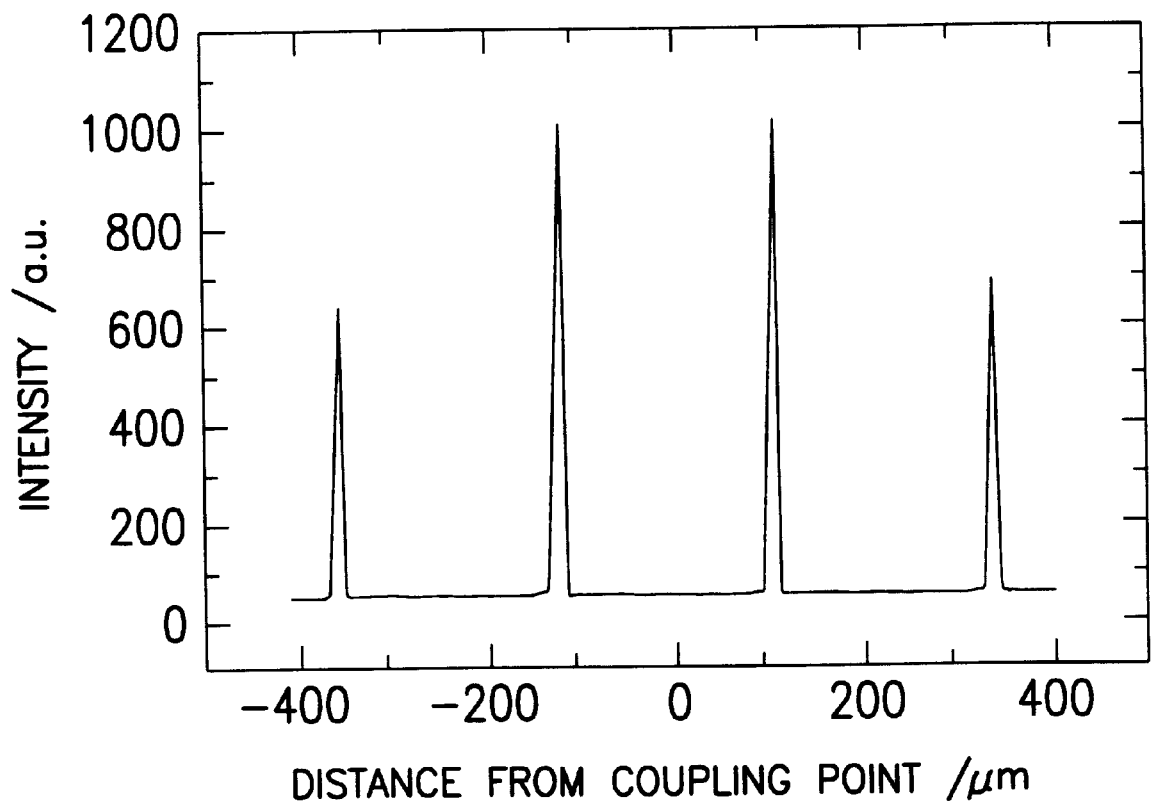
FIG. 4 shows the unevenly distributed light intensity measured at the output of the output waveguide shown in FIG. 1, at a wavelength of 835 nm, plotted over the distance of the output waveguides from one another.

FIG. 4 illustrates an uneven distribution of intensity at the output of four output waveguides 20a, 20b at a wavelength of 835 nm. In this case, the inside output waveguides 20a transmit a higher light intensity that the two outer waveguides 20b. Such an uneven intensity distribution can be beneficial, for example, when output waveguides 20a and 20b are configured with different lengths, but are supposed to supply the same optical power at the output. The parameters for this optical branching element 5 are given by:

waveguide width d=2 μm distance $a_1$=1.0 μm distance $a_2$=1.0 μm $L_1$=300 μm $L_2$=600 μm angle $\alpha_1$=1.0° angle $\alpha_2$=1.8°

The distance between output waveguides 20a, 20b at the output of branching element 5 was about 250 μm.

The parameters are essentially selected as a function of the characteristic curve of the refractive index of a strip waveguide in the vertical and horizontal direction; the characteristic curve of the refractive index, in turn, is a function of the manufacturing process.

The present invention makes it possible to distribute the light, which is launched into input waveguide 10, with a defined intensity to output waveguides 20a, 20b. The manufacturing process can also be simplified by using straight waveguides.

What is claimed is:

1. An optical branching element in a transparent material, the optical branching element comprising:

an input waveguide; and a plurality of output waveguides disposed at specific distances from the input waveguide, so that a beam of light launched into the input waveguide over a coupling path of a predefined length couples over with a defined intensity into the output waveguides.

2. The optical branching element as recited in claim 1 wherein a longitudinal axis of the input waveguide forms an acute angle a with a longitudinal axis of at least one of the plurality of output waveguides.

3. The optical branching element as recited in claim 2 wherein the angle α is preferably between 0.1° to 3°.

4. The optical branching element as recited in claim 1 wherein a longitudinal axis of the input wave guide forms acute angles $\alpha_i$ with longitudinal axes of the plurality of output waveguides, and that the acute angle $\alpha_i$ increases with the distance between the i-th output waveguide and the input waveguide.

5. The optical branching element as recited in claim 1 wherein the angles $\alpha_i$ are preferably between 0.1° to 3°.

6. The optical branching element as recited in claim 1 wherein the output waveguides are arranged symmetrically about the input waveguide and are offset from one another by a predefined width.

7. The optical branching element as recited in claim 1 wherein a dimensional design of the input waveguide and of the output waveguides is so selected they conduct only one mode.

8. The optical branching element as recited in claim 1 wherein the input waveguide and the output waveguides run rectilinearly in the area of the coupling path.

* * * * *